UNITED STATES PATENT OFFICE.

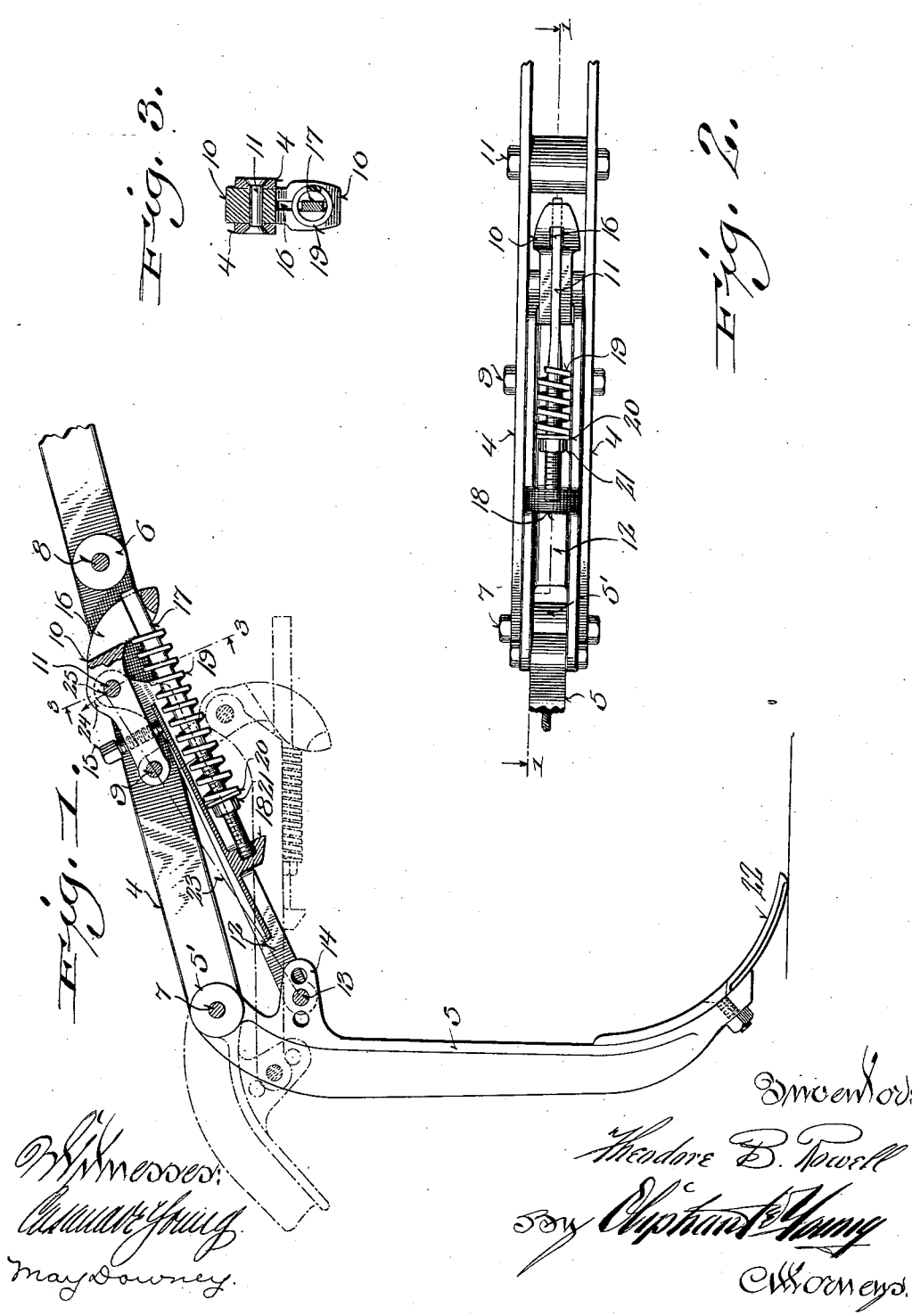

THEODORE B. ROWELL, OF BEAVER DAM, WISCONSIN, ASSIGNOR TO THOMAS S. ROBERTS, OF EVANSTON, ILLINOIS.

SEEDER AND CULTIVATOR TOOTH.

1,087,319.  Specification of Letters Patent.  Patented Feb. 17, 1914.

Application filed August 25, 1913. Serial No. 786,435.

*To all whom it may concern:*

Be it known that I, THEODORE B. ROWELL, a citizen of the United States, and resident of Beaver Dam, in the county of Dodge and State of Wisconsin, have invented certain new and useful Improvements in Seeder and Cultivator Teeth; and I do hereby declare that the following is a full, clear, and exact description thereof.

My invention consists in what is herein particularly set forth with reference to the accompanying drawings and pointed out in the claims of this specification, its object being to provide simple, economical, durable and efficient spring-trip tooth mechanism for seeders and cultivators organized to permit of ready locking of the tooth against trip action if desired.

Figure 1 of the drawings represents a partly sectional side elevation of a spring-trip seeder or cultivator tooth mechanism in accordance with my invention, the section being indicated by line 1—1 in the next described figure; Fig. 2, a plan view of the same inverted and having parts thereof broken away, and Fig. 3, a transverse section on the plane indicated by line 3—3 in Fig. 1.

Referring by numerals to the drawings, 4 indicates each of a pair of flat metal bars set edgewise and bolted together against a spacing-head 5' of tooth-shank 5 and a spacing-block 6 to form a draft-beam pivotally attachable to a hanger-clip or rod of a seeder or cultivator, similar bars for the same purpose being usual in the art to which my invention pertains. Said spacing-head of the tooth-shank is loose on a bolt 7, and a bolt 8 engages said spacing-block. Loose on another bolt 9 extending through the bars 4 is one end of an arm 10 having its other and free end inturned and slotted. Loose on a bolt or rivet 11 extending through the arm is the forward forked end of a link-bar 12, and the forked rear end of the link-bar is loose on a bolt 13 that extends through any one of a series of apertures in a forward upper lug 14 of the tooth shank, said link-bar being thus in adjustable connection with said tooth-shank to determine the normal set of the tooth therewith.

Engaging the swing-arm 10 between the pivots thereof and opposing the underneath link-bar 12 is a set-screw 15, and guided in the slot 16 of the free end of said arm is a preferably flattened portion of a screw-rod 17 that has its other end in a socket-lug 18 of said link-bar. The screw-rod extends through a spiral-spring 19 between the arm 10 and a washer 20 on said rod next a rod-engaging nut 21 adjustment of the nut serving to regulate the tension of said spring.

By means of the set-screw 15, the arm 10 is adjusted to move its pivot connection 11 with the link-bar 12 inward out of dead-center line with the pivot-bolts 7 and 9, if it is desirable to provide for an automatic trip of the tooth 22, on the shank 5, in case said tooth meets with an obstruction of sufficient resistance, the ease of the trip depending on said arm adjustment and the tension of the spring 19. If the arm 10 be adjusted by means of the screw 15 to have its pivot connection 11 with the link-bar 12 centered in line with the pivot-bolts 7 and 9, the tooth 22 with its shank 5 are held rigid in connection with the draft-beam aforesaid, and the pitch of said tooth with reference to its depth of run is regulated by the adjustable connection of said link-bar with the lug 14 of said shank.

An adjustment of the arm and link pivotal connection 11 out of dead center line with the pivot-bolts 7 and 9 is indicated in Fig. 1, by dotted lines 23, 24, and a dot 25, and the position of movable parts subsequent to a trip of the tooth is indicated by dotted lines in the same showing.

From the foregoing it will be readily understood that said tooth may be set to trip hard or easy or not at all by a slight adjustment of a single screw.

The mechanism herein specified is not liable to get out of order, but in case of fracture of any part thereof a new one may be readily substituted.

I claim:

1. A seeder or cultivator spring-trip tooth mechanism comprising a draft-member, a tooth-shank and an arm in alined pivotal connection with the draft-beam, a link-bar in pivotal connection at its ends with the tooth-shank and arm, a set-screw adjustable in the arm between the pivots thereof in opposition to the link-bar, a rod supported by said link-bar and a slotted free end of the arm, an arm-opposing spring surrounding the rod, and means with said rod for tensioning the spring.

2. A seeder or cultivator spring-trip tooth mechanism comprising a draft-member, a tooth-shank and an arm in alined pivotal connection with the draft-beam, a link-bar in pivotal connection at its ends with the tooth-shank and arm and having a depending socket-lug, a set-screw adjustable in the arm between the pivots thereof in opposition to the link-bar, a rod engaging said socket lug and extending through a slotted free end of said arm, an arm-opposing spring surrounding the rod, and means with said rod for tensioning the spring.

3. A seeder or cultivator spring-trip tooth mechanism comprising a draft-member, a tooth shank and an arm in alined pivotal connection with the draft-beam, a link-bar in adjustable pivotal connection at one end with the tooth-shank and having its other end pivoted to the arm, a set-screw adjustable in the arm between the pivots thereof in opposition to the link-bar, a rod supported by said link-bar and a slotted free end of the arm, an arm-opposing spring surrounding the rod, and means with said rod for tensioning the spring.

In testimony that I claim the foregoing I have hereunto set my hand at Beaver Dam in the county of Dodge and State of Wisconsin in the presence of two witnesses.

THEO. B. ROWELL.

Witnesses:
J. F. MALONE,
IRA B. LUTHER.

Copies of this patent may be obtained for five cents each, by addressing the "Commissioner of Patents, Washington, D. C."